(12) United States Patent
Mull

(10) Patent No.: US 12,256,470 B2
(45) Date of Patent: Mar. 18, 2025

(54) HEATED JOYSTICK

(71) Applicant: Tevin Mull, Vinton, IA (US)

(72) Inventor: Tevin Mull, Vinton, IA (US)

( * ) Notice: Subject to any disclaimer, the term of this patent is extended or adjusted under 35 U.S.C. 154(b) by 883 days.

(21) Appl. No.: 17/405,158

(22) Filed: Aug. 18, 2021

(65) Prior Publication Data

US 2022/0386416 A1  Dec. 1, 2022

Related U.S. Application Data (60) Provisional application No. 63/192,817, filed on May 25, 2021.

(51) Int. Cl.
| | |
|---|---|
| *H05B 1/02* | (2006.01) |
| *B60R 16/03* | (2006.01) |
| *B60R 16/04* | (2006.01) |
| *G06F 3/0338* | (2013.01) |
| *H05B 3/34* | (2006.01) |
| *H05B 3/40* | (2006.01) |

(52) U.S. Cl.
CPC ............. *H05B 1/023* (2013.01); *B60R 16/03* (2013.01); *B60R 16/04* (2013.01); *G06F 3/0338* (2013.01); *H05B 3/342* (2013.01); *H05B 3/40* (2013.01); *H05B 2203/016* (2013.01); *H05B 2203/035* (2013.01)

(58) Field of Classification Search
CPC ............... H05B 3/46; H05B 2203/014; H05B 2203/016; H05B 2203/035; H05B 3/34; H05B 1/0227; H05B 1/023; H05B 3/342; H05B 3/40; H05B 3/42

USPC ....... 219/204, 202, 494, 544, 533, 535, 541, 219/548, 201, 476, 482, 497, 504, 506, 219/522, 549
See application file for complete search history.

(56) References Cited

U.S. PATENT DOCUMENTS

| | | | | |
|---|---|---|---|---|
| 6,114,668 | A * | 9/2000 | Ogata .................... | B62K 21/26 74/551.8 |
| 6,844,524 | B2 * | 1/2005 | Downey .................. | B62J 33/00 219/494 |
| 7,010,997 | B2 * | 3/2006 | Dzurnak ................. | B62K 21/26 74/551.9 |
| 7,291,814 | B2 * | 11/2007 | Oishi ..................... | B62K 21/26 219/202 |
| 7,805,812 | B2 * | 10/2010 | Ohishi .................... | B62J 33/00 16/421 |
| 7,891,270 | B2 * | 2/2011 | Higashi .................. | B62K 21/26 219/202 |

(Continued)

*Primary Examiner* — Chris Q Liu
(74) *Attorney, Agent, or Firm* — Brennan, Manna & Diamond, LLC (57) ABSTRACT

The present invention relates to a heated joystick that is configured to be used with heavy-duty machines, excavators, snowplows, dump trucks and the like. The heated joystick comprises integrated heating elements for heating the surface of the joystick, a controller for controlling the operation of the integrated heating elements, and a wiring circuit to power the integrated heating elements and the controller. The wiring circuit can be connected to an external battery or to the vehicle's power system to supply power to the heated joystick. The heated joystick with the integrated heating elements provides heating of a joystick surface, thereby allowing an operator to easily hold the joystick with their bare hands in cold weather conditions.

20 Claims, 6 Drawing Sheets

(56) References Cited

U.S. PATENT DOCUMENTS

| | | | |
|---|---|---|---|
| 8,481,889 B2 * | 7/2013 | Fujiwara | B62K 21/26 |
| | | | 219/535 |
| 8,680,436 B2 * | 3/2014 | Schmauder | B62J 33/00 |
| | | | 219/204 |
| 2018/0002893 A1 * | 1/2018 | Heinzmann | E02F 3/96 |
| 2019/0174950 A1 * | 6/2019 | Hendrickson | A47J 31/52 |

* cited by examiner

HEATED JOYSTICK

CROSS-REFERENCE TO RELATED APPLICATION

The present application claims priority to, and the benefit of, U.S. Provisional Application No. 63/192,817, which was filed on May 25, 2021 and is incorporated herein by reference in its entirety.

FIELD OF THE INVENTION

The present invention relates generally to the field of joysticks. More specifically, the present invention relates to a heated joystick featuring an integrated heating mechanism. The integrated heating mechanism comprises a plurality of integrated wires and/or coils that act to provide heat and keep a vehicle operator's hands warm while operating vehicles during the winter. Additionally, the heated joystick eliminates the need for a user to wear oversized gloves or mittens, or to stop work to warm their hands. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, joysticks are a tool used to control machines and heavy equipment such as cranes, trucks and other manufacturing operations. Heavy-duty joysticks are also used for a variety of applications including construction, mining and excavation, medical, manufacturing, etc. Specifically, heavy-duty joysticks and controllers are often used in construction vehicles and equipment such as bulldozers, road rollers, compactors, loaders and backhoes to mobilize a vehicle and/or provide ancillary handling functions such as controlling the backhoe or loader systems. Heavy-duty joystick controllers have evolved into a variety of designs, and include a plurality of functions which make the controllers productive and efficient, and fulfils the needs and/or requirements of different users.

However, while using heavy-duty joysticks and controllers to operate heavy machinery and equipment in extremely cold weather conditions, a user's hands can become cold and freeze quickly. This is especially true if the user operates the heavy-duty joysticks with their bare hands. Having cold hands and fingers can make it difficult to operate a joystick, especially if the user is required to operate the vehicle continuously. Thus, users may have to frequently stop their work to warm their hands, which causes the users to spend more time warming their hands than operating their machinery. Accordingly, using standard heavy-duty joysticks/controllers in cold weather can be extremely frustrating, uncomfortable and undesirable for most users.

To overcome the issue of cold hands, some users may utilize heavy-duty gloves or mittens while using their joystick/controller to operate vehicles. Generally, the heavy-duty gloves or mittens are helpful in preventing shock and burns from electrical contact, and are also lined with insulating wool and thermal material to keep a user's hands warm. However, users may struggle with oversized heavy-duty gloves and mittens and may be unable to operate the joystick/controller properly and precisely while wearing them.

Therefore, there exists a long-felt need in the art for a joystick device that allows a user to easily operate heavy machinery in extremely cold weather conditions. There is also a long-felt need in the art for an improved heavy-duty joystick or controller that ensures that a user's hands do not freeze while operating the joystick in winter and/or cold climates, and eliminates the need for users to stop their work and warm their hands, thereby allowing users to work for longer periods of time in cold weather conditions. Moreover, there is a long-felt need in the art for a modified joystick that allows users to operate joysticks with their bare hands and eliminates the need for a user to wear oversized gloves and/or mittens. Furthermore, there is a long-felt need in the art for a joystick device that ensures a comfortable vehicle operating experience in cold weather conditions, wherein the joystick is easy to use and can be integrated with any standard vehicle to ensure an enhanced user experience.

The subject matter disclosed and claimed herein, in one embodiment thereof, comprises a heated joystick device. The joystick device is designed to warm the joystick to provide comfort to users in cold conditions. More specifically, the device comprises a head portion, a shaft and a base portion. Further, a first heating element further warms the head portion, a second heating element warms the shaft and a pair of connecting cords provides power to said first heating element and said second heating element. A controller also controls the temperature of said first and second heating elements, wherein the pair of connecting cords are also connected to a power supply for providing power.

In this manner, the novel heated joystick device of the present invention accomplishes all of the forgoing objectives, and provides a relatively safe, easy and efficient solution to maintaining the warmth of a user's hands while operating heavy machinery and equipment via a joystick in cold weather conditions. The heated joystick device of the present invention is also user-friendly, as it does not require users to frequently stop work to warm their hands, and therefore allows users to quickly complete their work. Also, the heated joystick device prevents users from having to wear oversized gloves and mittens to operate the joystick. Therefore, the heated joystick device enhances the overall vehicle operating experience in extremely cold weather conditions.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a joystick device with an integrated heating mechanism. The joystick device is configured to warm the joystick to provide comfort to users in cold conditions. The joystick device further comprises a head portion having controls for operating the machinery, a shaft, a base portion, a first heating element for warming the head portion, a second heating element for warming the shaft, a pair of connecting cords for providing power to said first heating element and said second heating element and a controller to control the temperature of said first and second heating elements. Further, the pair of connecting cords are connected to a power supply for providing power. The controller can also selectively activate or deactivate the first heating element and the second heating element.

In a further embodiment of the present invention, a joystick device is disclosed. The joystick device comprises an integrated heating coil for warming the surface of the joystick device, a temperature controller to control the temperature of said heating coil, and a pair of connecting cords for providing power to said heating coil, wherein the pair of connecting cords are connected to a power supply of the machine or vehicle with which the joystick is used by the operator. Further, the heating coil is configured to heat up when electricity is passed through the heating coil allowing warming of the joystick surface.

In another differing embodiment of the present invention, a joystick kit for retrofitting a heavy-duty machine to warm an operator's hand during use is disclosed. The joystick kit includes a joystick device configured to replace an existing joystick, a heating element integrated into the joystick device, and a pair of connecting cords configured to connect to the heating element and to an existing power supply of the heavy-duty machine to provide electrical power to the heating element, to heat up and provide warmth to the joystick device surface. Additionally, a small battery is included in the joystick kit for providing electrical power to the heating element.

The present invention may also have a differing embodiment that comprises a portable heated cover for a heavy-duty machine joystick is disclosed. The heated cover is configured and designed to cover an installed joystick and conform to the shape of the joystick. The cover further includes a heating element sewn along the length of the cover for warming an operator's hand. A pair of connecting cords are integrated into the cover for providing power to said heating element, and wherein the connecting cords are connected to a power supply of the machine or vehicle with which the joystick is used by the operator. Further, the heating element can be in the form of a coil or a straight thin plate.

Further, any embodiment of the joystick device can be constructed of waterproof materials. Alternatively, the joystick device may be able to receive a cover with a heating mechanism rather than the heating mechanism being integrated within the joystick itself. However, a vehicle typically provides the heating elements with electrical power via a wire or other suitable connection.

Accordingly, the joystick device of the present invention is advantageous as it allows users to keep their hands warm and prevents their fingers from freezing. With the inventive joystick and cover, users can also hold the joystick with their bare hands rather than struggling with oversized gloves or mittens. The device also eliminates users from having to constantly stop and warm their hands while operating machinery.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a joystick device that allows users to easily operate heavy machinery in extremely cold weather conditions. There is also a-long felt need in the art for an improved heavy-duty joystick or controller that ensures that the hands of a user do not freeze while using a joystick in cold conditions, and that eliminates the need for users to stop their work and warm their hands to allow users to work for longer hours in cold weather conditions. Moreover, there is a long-felt need in the art for a modified joystick that allows users to use joysticks with their bare hands while also preventing their hands and/or fingers from freezing in cold weather conditions, and that eliminates the need to wear oversized gloves or mittens during cold conditions. Furthermore, there is a long-felt need in the art for a joystick device that ensures a comfortable vehicle operating experience in cold weather conditions that is easy to use, can be integrated with any standard vehicle and ensures an enhanced user experience.

The present invention, in one exemplary embodiment, is comprised of a novel heated joystick device. The device has an integrated heating coil for warming the surface of the joystick, a pair of connecting cords for providing power to said integrated heating coil, and a temperature controller to control the temperature of said integrated heating coil. Further, the connecting cords are connected to a power supply of the machine or vehicle with which the joystick is used by the operator. The heating coil is configured to heat up when electricity is passed through the heating coil allowing warming of the joystick surface.

Figure 1:
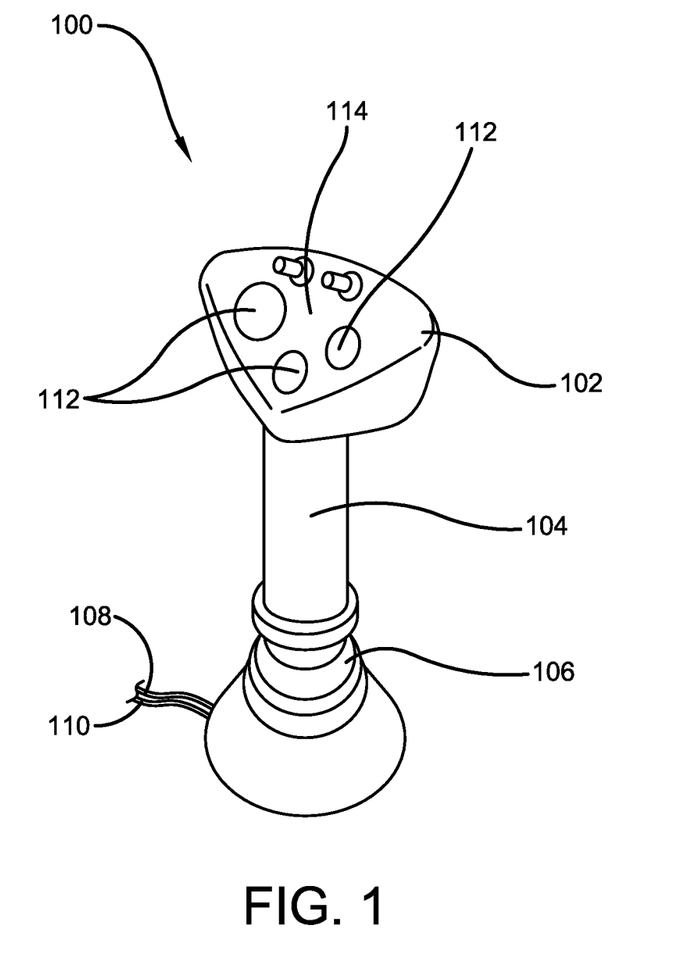
FIG. 1 illustrates a perspective view of one potential embodiment of a heated joystick device of the present invention in accordance with the disclosed architecture.

Referring initially to the drawings, FIG. 1 illustrates a perspective view of one potential embodiment of a heated joystick device 100 of the present invention in accordance with the disclosed architecture. The heated joystick device 100 of the present invention is designed as a heavy machinery joystick which can be used with excavators, snowplow machines, dump trucks, etc., or any other suitable machinery as is known in the art. The heated joystick device 100 is equipped with integrated heating elements 202, 204 within the joystick housing cavity 101 (shown in FIG. 2) that provides heat to the surface 114 of the heated joystick device 100, thereby allowing a user to easily hold the joystick device 100 with his or her bare hands even in cold climates and/or weather. The surface 114 of the joystick device 100 can further be smooth or textured, depending on the wants and/or needs of a user. The surface 114 may also be thermally conductive so as to transmit heat throughout the surface 114 to warm a user's hands and/or fingers. Further, the heated joystick device 100 can be configured in a multitude of different shapes and/or sizes, and can be used in a variety of contexts, such as being used to control and/or manipulate a vehicle, a robotic vehicle, a construction vehicle, and/or any other suitable device and/or system that can be manipulated by a joystick as is known in the art.

The heated joystick device 100 also comprises a joystick head component 102, a joystick base component 106 and a shaft 104 extending from the head component 102 to the base component 106. The head component 102 and the shaft 104 are generally held by an operator (or user) while using the heated joystick device 100 and integrated heating elements 202, 204 (shown in FIG. 2) that warm the thermally conductive surface 114 of the heated joystick device 100. The heated joystick device 100 can be installed during manufacture of the vehicle, or can also be retrofitted in a vehicle aftermarket. In the present embodiment, the heated joystick device 100 is manufactured of a thermally conductive plastic, such as a plastic formulated from carbon, resin and a solvent. However, the device 100 can be manufactured from any other thermally conductive material as is known in the art.

Furthermore, the heated joystick device 100 is commercially available with integrated heating elements 202, 204 along with connecting wires 108, 110. Specifically, integrated heating elements 202, 204 of the heated joystick device 100 receive electrical power through connecting cords 108, 110. A first connecting cord 108 comprises a connector 1080, and the second connecting cord 110 also comprises a corresponding connector 1100. The connectors 1080, 1100 are used for making an electrical connection with electrical charging cords 402, 404 (shown in FIG. 4). The connecting wires 108, 110 provide electrical power to the integrated heating elements 202, 204 for warming the surface 114 of the heated joystick device 100. The connecting wires 108, 110 can be connected to any compatible connector of the vehicle to provide power to the heated joystick device 100. Alternatively, a small battery 208 (shown in FIG. 2) may be coupled to the heated joystick device 100 to allow the connecting wires 108, 110 to connect to the battery 208 to provide electrical power to the heated joystick device 100. Thus, the heated joystick device 100 allows a user to operate control buttons 112 on the head component 102 without freezing their fingers. Further, utilizing a warm joystick allows users to operate the joystick with their bare hands rather than struggling with oversized gloves or mittens.

Figure 2:
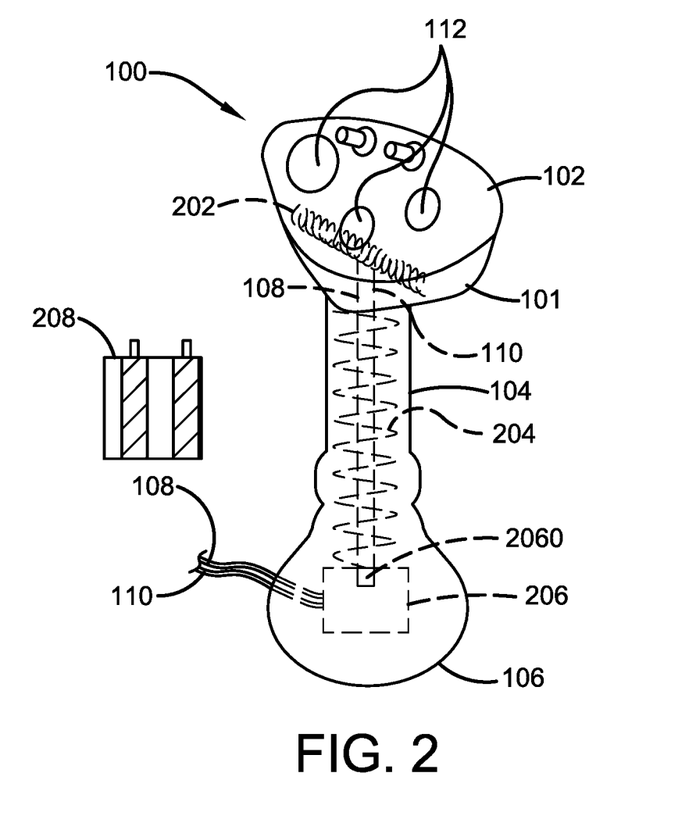
FIG. 2 illustrates a perspective view of the integrated heating system of one potential embodiment of a heated joystick device of the present invention in accordance with the disclosed architecture.

FIG. 2 illustrates a perspective view of the integrated heating system of one potential embodiment of a heated joystick device 100 of the present invention in accordance with the disclosed architecture. A first integrated heating element 202 is configured within the head component 102 and a second integrated heating element 204 is configured within the shaft 104. In the present embodiment, the heating elements 202, 204 are coil-like electrical heating elements fixedly installed along the shaft 104 and near the head component 102, to create one or more heating zones for providing heat to the surface 114 of the heated joystick device 100, where direct contact of a user's hand is positioned when holding the heated joystick device 100. The heated joystick device 100 also comprises a built-in temperature controller 206 for controlling the temperature of the surface 114 and for automatically turning-off the heating elements 202, 204 when a desired temperature threshold is reached. The temperature controller 206 can be positioned within the joystick base component 106 or any other suitable area within the housing cavity 101. Further, heating elements 202, 204 are coupled to the built-in temperature controller 206 and are housed within the cavity 101 of the heated joystick device 100. The heating elements 202, 204 provide a uniform and consistent heating of one or more heating zones of the joystick head component 102 and the shaft 104. The temperature controller 206 also preferably has a preset threshold temperature and a temperature sensor 2060 to monitor the temperature of the surface 114 produced by the heating elements 202, 204. Once the temperature of the heating elements 202, 204 reaches the preset threshold temperature, the temperature controller 206 selectively turns-off the power supply to the heating elements 202, 204, thus allowing the surface 114 of the heated joystick device 100 to maintain a comfortable temperature for the user.

Figure 3:
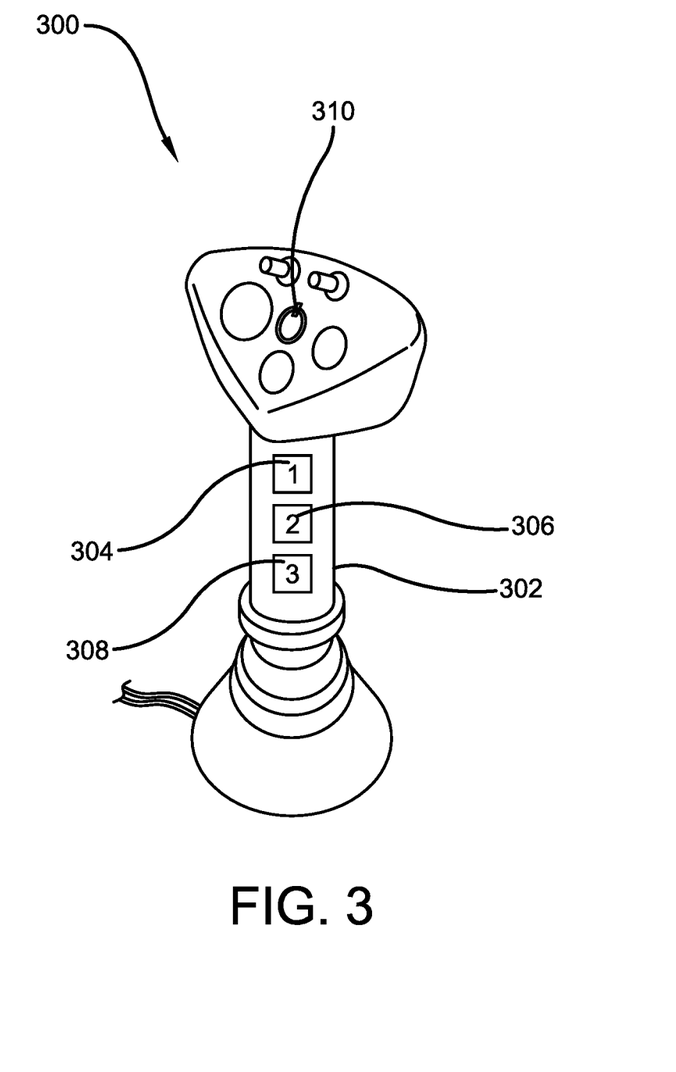
FIG. 3 illustrates a perspective view showing one potential embodiment of a heated joystick device of the present invention in accordance with the disclosed architecture.

FIG. 3 illustrates a perspective view showing one potential embodiment of a heated joystick device 100 of the present invention in accordance with the disclosed architecture. This particular embodiment 300 of the device 100 of the present embodiment has a plurality of control buttons 304, 306, 308, preferably on the shaft 302. The plurality of control buttons 304, 306, 308 are internally connected to a temperature controller that is integrated into the heated joystick device 300. A first control button 304 allows the temperature created by the integrated heating elements (shown in FIG. 2) to be set to "Low", which allows a user to operate the heated joystick device 300 in less cold conditions. A second control button 306 allows the temperature created by the integrated heating elements to be set to "Moderate", which allows a user to operate the heated joystick device 300 in moderately cold conditions. A third control button 308 allows the temperature created by the integrated heating elements to be set to "High", which allows a user to operate the heated joystick device 300 in extremely cold conditions. Additionally, the heated joystick device 300 also comprises a power button 310 which is used for turning on and/or off the integrated heating elements 202,204. Specifically, the built-in connection of the integrated heating elements is controlled via the activation of the power button 310.

Figure 4:
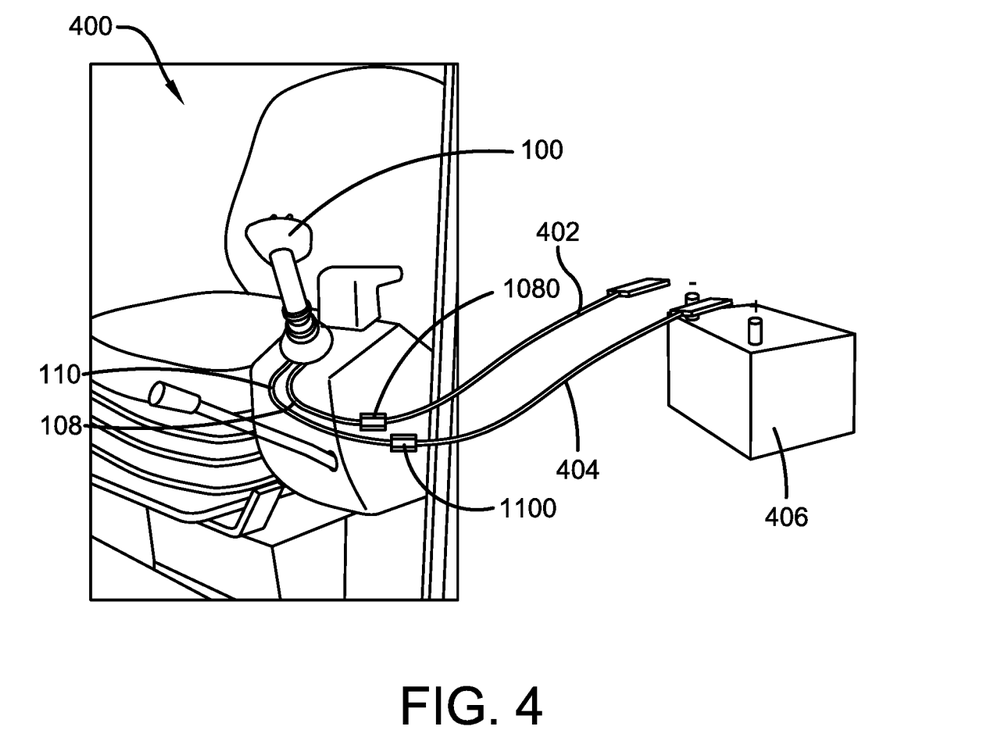
FIG. 4 illustrates a perspective view showing the wired connection of one potential embodiment of a heated joystick device of the present invention with an exemplary power source in accordance with the disclosed architecture.

FIG. 4 illustrates a perspective view showing the wired connection of one potential embodiment of a heated joystick device 100 of the present invention with an exemplary power source in accordance with the disclosed architecture. Specifically, the integrated heating elements 202, 204 of the heated joystick device 100 receive electrical power through connecting cords 108, 110, with the first connecting cord 108 comprising connector 1080, and the second connecting cord 110 comprising corresponding connector 1100. The connectors 1080, 1110 are used for creating an electrical connection with the electrical charging cords 402, 404 of the excavator or other vehicle 400 (shown as prior art). The charging cords 402, 404 are also connected to an independent or integrated power source 406 built-into the excavator 400, or any other suitable power source as is known in the art. The electrical charging cords 402, 404 may also comprise compatible connectors to connect to the respective connectors 1080, 1110 of the connecting cords 108, 110. Thus, the electrical power supplied to the integrated heating elements is used for producing heat to warm the joystick surface 114.

Figure 5:
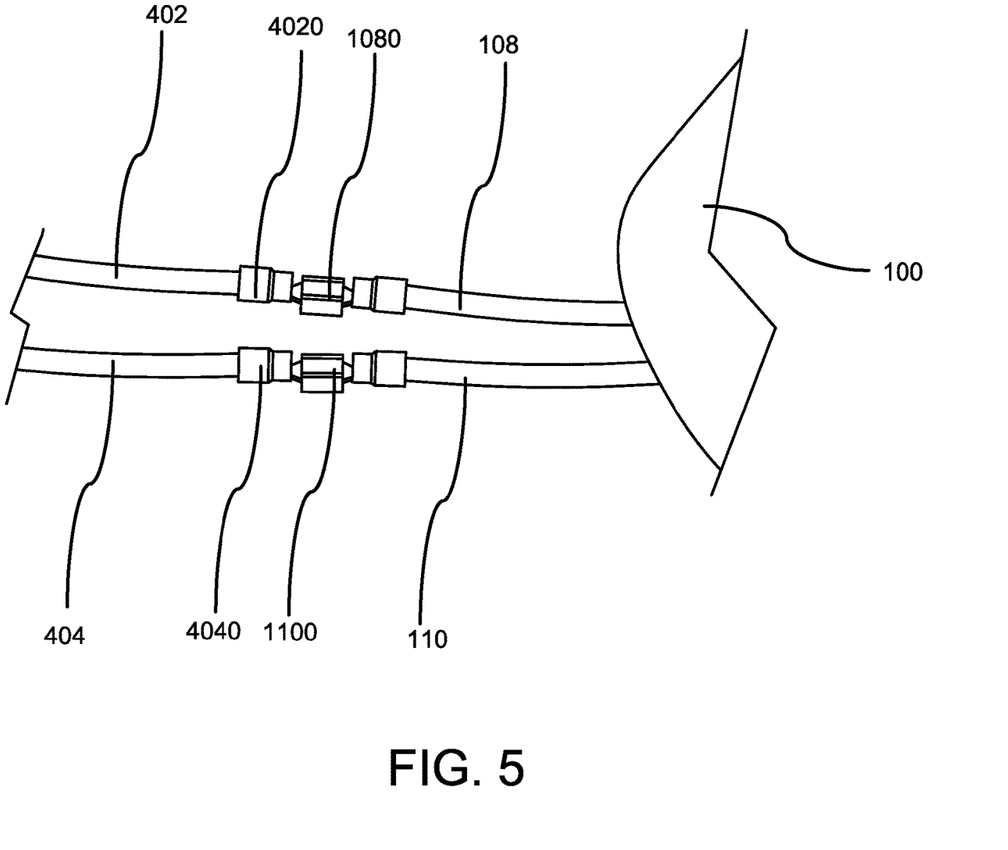
FIG. 5 illustrates a close-up view showing the electrical connection of one potential embodiment of a heated joystick device of the present invention in accordance with the disclosed architecture.

FIG. 5 illustrates the typical electrical connection of the heated joystick device of the present invention. To provide electrical power to the integrated heating elements of the heated joystick device 100, a connector 1080 of a first connecting cord 108 is connected to an electrical connector 4020 of the electrical cord 402 of the vehicle in which the heated joystick device 100 is installed. Similarly, second connector 1100 of a second connecting cord 110 is connected to the electrical connector 4040 of the second electrical cord 404 of the same vehicle. The resulting electrical connections between the connectors 4020 and 1080; and 4040 and 1100 provide electrical power to the integrated heating elements for heating the heated joystick device 100.

Figure 6:
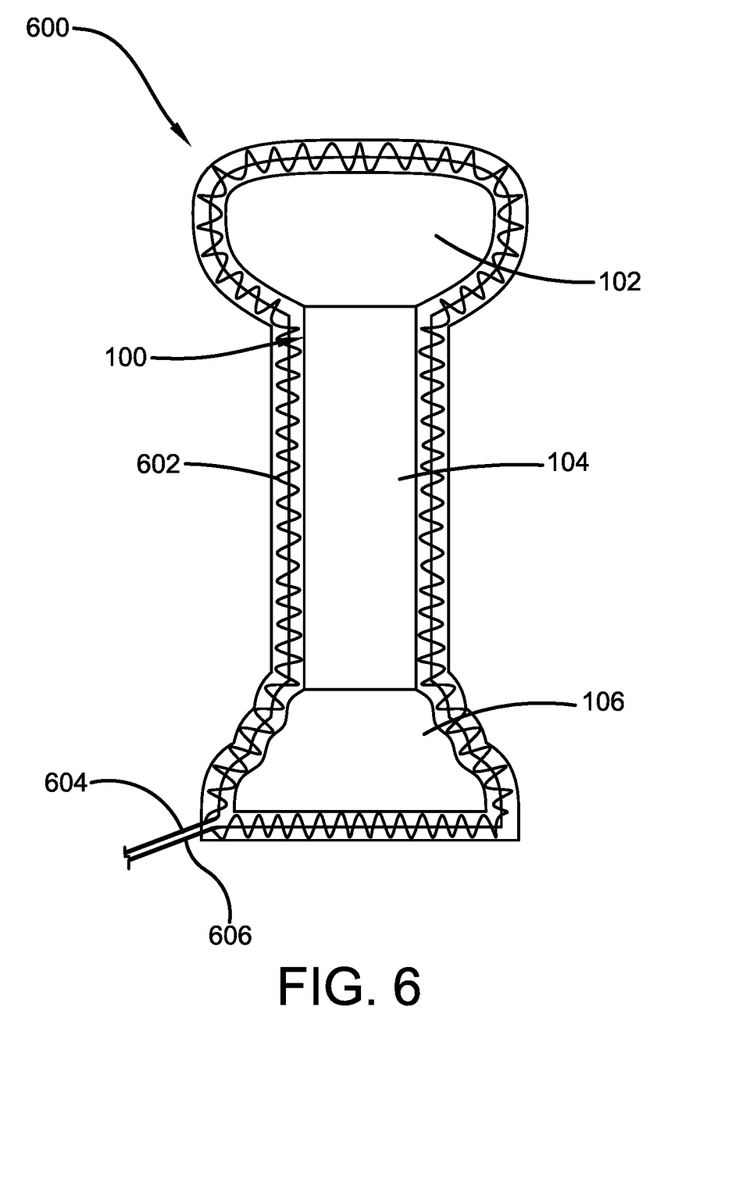
FIG. 6 illustrates a perspective view of a heated cover for one potential embodiment of a joystick device of the present invention in accordance with the disclosed architecture.

FIG. 6 illustrates a perspective view of a heated cover 600 for one potential embodiment of a joystick device 100 of the present invention in accordance with the disclosed architecture. In the present embodiment, a removable heated cover 600 for covering a conventional joystick (shown as prior art) is disclosed. The heated cover 600 can be manufactured of any suitable thermally conductive material such as leather, polyester or any other fabric as is known in the art. The heated cover 600 conforms to the shape of a conventional joystick and comprises a heating element 602 sewn into the heated cover 600. The heating element 602 can be configured as a coil or alternatively as a heating plate and is typically connected to two heating cords 604, 606 for providing electrical power to the heating element 602. The heated cover 600 and the heating element 602 cover the head, shaft and a portion of the base of a conventional joystick. Further, the heated cover 600 can also comprise a transparent covering for the head area, thereby allowing a user to easily view the control buttons for operating the machinery. Additionally, the heating cords 604, 606 can be connected to and used with any conventional power supply to supply heat to the heated cover 600 for providing a user comfort in cold conditions.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "heated joystick device", "joystick device", "device", "joystick kit", "portable heated cover", "heated cover", and "cover" are interchangeable and refer to the heated joystick device 100, 300 of the present invention.

Notwithstanding the forgoing, the heated joystick device 100, 300 of the present invention can be of any suitable size and configuration as is known in the art without affecting the overall concept of the invention, provided that it accomplishes the above-stated objectives. One of ordinary skill in the art will appreciate that the size, configuration, and material of the heated joystick device 100, 300 as shown in FIGS. 1-6 are for illustrative purposes only, and that many other sizes and shapes of the heated joystick device 100, 300 are well within the scope of the present disclosure. Although the dimensions of the heated joystick device 100, 300 are important design parameters for user convenience, the heated joystick device 100, 300 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A heated joystick device for use with a heavy machine or a vehicle in a cold weather condition, the heated joystick device comprising:
   a head component;
   a base component;
   a shaft extending from the head component to the base component; and
   an integrated heating element which heats a surface of the head component and the shaft, wherein a user retains the head component and the shaft while operating the heated joystick device; and
   a heated cover that covers the head component, the shaft, and a portion of the base component, wherein the heated cover conforms to a shape of the head component, the shaft, and the portion of the base component, and comprises a transparent covering for the head component, thereby allowing a user to easily view control buttons on the head component for operating a heavy machine or a vehicle.

2. The heated joystick device of claim 1, wherein the surface is thermally conductive.

3. The heated joystick device of claim 1, wherein the integrated heating element is electrically connected to a power supply source.

4. The heated joystick device of claim 3, wherein an electrical connection of the integrated heating element comprises at least one connection cord and a corresponding connector which connects the integrated heating element with an electrical charging cord, which provides power from the power supply source.

5. The heated joystick device of claim 4, wherein the electrical connection comprises a second connection cord and a corresponding connector with connects the integrated heating element with the power supply source.

6. The heated joystick device of claim 5, wherein the at least one connection cord and the second connection cord connects to any compatible connector of a vehicle to provide power.

7. The heated joystick device of claim 3, wherein the power supply source is a battery.

8. The heated joystick device of claim 1 wherein the heated cover is manufactured of a thermally conductive material such as leather, polyester or fabric and comprises a heating element sewn into the heated cover and two heating cords for providing electrical power to the heating element.

9. A heated joystick device for use with a heavy machine, the heated joystick device comprising:
 a head component;
 a base component;
 a shaft extending from the head component to the base component;
 a first integrated heating element positioned within the head component;
 a second integrated heating element positioned within the shaft; and
 a housing cavity for housing the first and the second integrated heating elements,
 wherein both the first and the second integrated heating elements heat a surface of the head component and the shaft, and further wherein a user retains the head component and the shaft while operating the heated joystick device; and
 a heated cover that covers the head component, the shaft, and a portion of the base component, wherein the heated cover conforms to a shape of the head component, the shaft, and the portion of the base component, and comprises a transparent covering for the head component, thereby allowing a user to easily view control buttons on the head component for operating a heavy machine or a vehicle.

10. The heated joystick device of claim 9, wherein the first and the second integrated heating elements are configured as coil-shaped electrical heating elements.

11. The heated joystick device of claim 9 further comprising a built-in temperature controller for controlling a temperature of the surface.

12. The heated joystick device of claim 11, wherein the built-in temperature controller automatically turns-off the first and the second integrated heating elements when a desired temperature threshold is reached.

13. The heated joystick device of claim 12, wherein the built-in temperature controller is housed within the housing cavity and is coupled to the first and the second integrated heating elements.

14. A heated joystick device for use with a heavy machinery such that a user can comfortably operate the heated joystick device with their bare hands in a cold climate, the heated joystick device comprising:
 a head component;
 a base component;
 a shaft extending from the head component to the base component;
 a first integrated heating element positioned within the head component;
 a second integrated heating element positioned within the shaft;
 a housing cavity for housing the first and the second integrated heating elements,
 wherein both the first and the second integrated heating elements heat a surface of the head component and the shaft;
 a plurality of control buttons positioned on the shaft for operating the heated joystick device; and
 a heated cover that covers the head component, the shaft, and a portion of the base component, wherein the heated cover conforms to a shape of the head component, the shaft, and the portion of the base component, and comprises a transparent covering for the head component, thereby allowing a user to easily view control buttons on the head component for operating a heavy machine or a vehicle.

15. The heated joystick device of claim 14, wherein the plurality of control buttons are internally connected to a temperature controller.

16. The heated joystick device of claim 15, wherein the temperature controller is housed within the housing cavity and is coupled to the first and the second integrated heating elements and comprises a preset threshold temperature and a temperature sensor to monitor a temperature of the surface produced by both the first and the second integrated heating elements.

17. The heated joystick device of claim 16, wherein the plurality of control buttons comprise a first control button which allows a temperature setting to be set to low.

18. The heated joystick device of claim 17, wherein the plurality of control buttons comprise a second control button which allows a temperature setting to be set to moderate.

19. The heated joystick device of claim 18, wherein the plurality of control buttons comprise a third control button which allows a temperature setting to be set to high.

20. The heated joystick device of claim 19, wherein the plurality of control buttons comprise a power button for turning on and off the first and the second integrated heating elements.

* * * * *